United States Patent Office 3,155,195
Patented Nov. 3, 1964

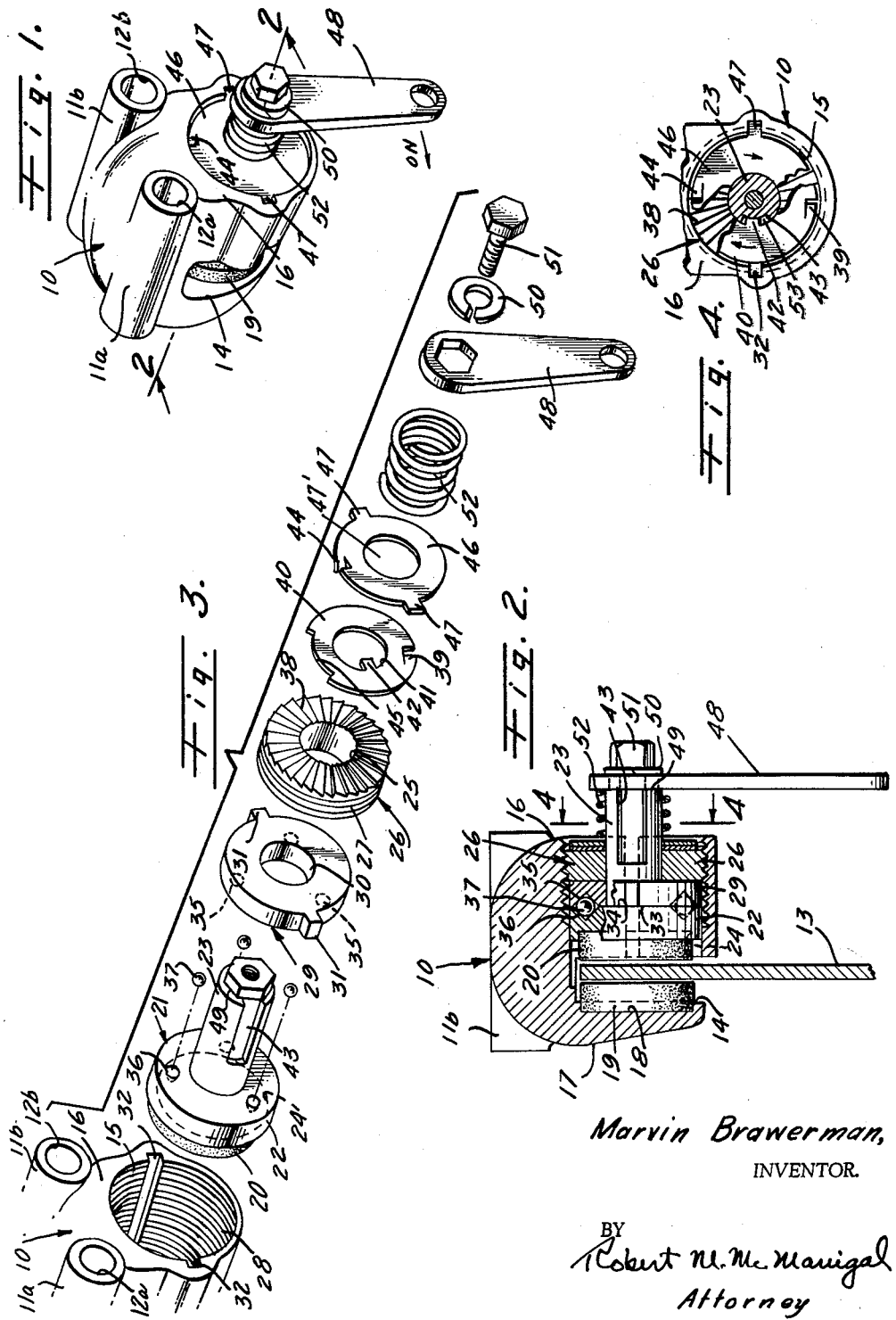
Marvin Brawerman, INVENTOR.

3,155,195
BRAKING MECHANISM
Marvin Brawerman, Pacoima, Calif., assignor to Airheart Products, Inc., Van Nuys, Calif., a corporation of California
Filed Feb. 11, 1963, Ser. No. 257,404
6 Claims. (Cl. 188—73)

The present invention relates generally to braking mechanisms for vehicles, machines and other devices, and is more particularly concerned with means for automatically compensating for wear of the braking elements, and maintaining brake release clearance between the braking elements.

Heretofore, self-adjusting brake mechanisms of the herein described character have been fluid operated, and while admirably adapted for use with automobiles and other vehicles, such braking mechanisms have not in the main been of sufficiently simple construction to economically permit their use on small vehicles such as karts, scooters and the like.

The present invention therefore envisions a self-adjustable brake mechanism of simple and economically producible construction which will permit utilization in connection with relatively low priced vehicles and other equipment.

Another object of the present invention is to provide an improved braking mechanism of the self-adjusting type which will automatically compensate for wear of the braking elements, and maintain non-braking clearance, and at the same time embody a compact construction utilizing relatively small, light and inexpensive parts.

Still another object is to provide a braking mechanism of the above type which is susceptible of manual operation, and which is not dependent upon a fluid supply source.

Briefly, the present invention comprises a rotatably mounted actuator which embodies a camming mechanism for moving the braking elements relatively to braking and non-braking positions. This actuator is rotatably mounted within an axially adjustable bushing arranged to be adjustably moved to compensate for wear of the braking elements by means of a pawl and ratchet which are operable through a lost motion connection in response to movements of the actuator in a direction to move the braking elements to non-braking position, although compensation in response to movement in a braking direction might be used under some conditions. By successively advancing the bushing, as the wear of the braking elements proceed, it is possible to compensate for a brake element wear, and by means of the lost motion connection to provide and maintain clearance between the braking elements when in non-braking position.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a perspective view of a braking mechanism embodying the features of the present invention;

FIG. 2 is a longitudinal vertical section, with certain portions shown in full lines, taken substantially on line 2—2 of FIG. 1;

FIG. 3 is an exploded view showing the associated sequence of the elements comprising the braking mechanism of this invention; and FIG. 4 is a transverse section, certain portions being broken away for clarity, taken substantially on line 4—4 of FIG. 2.

Referring generally to the accompanying drawings, for illustrative purposes, the present invention is shown as embodying a housing structure 10 arranged to be supported for a longitudinal adjusting movement. While the support may take various configurations and arrangements, in the present instance the housing is provided with a pair of spaced projections 11a and 11b containing parallel axial bores 12a and 12b which are adapted to receive supporting rods or bolts therein.

The braking mechanism of the present invention is arranged to be cooperatively associated with a braking disc 13 or other rotatable member of the vehicle to which braking forces are to be applied. The disc 13 and housing structure 10 are so mounted that the peripheral margin of the disc will extend through an arcuate opening 14 in the housing wall for cooperative association with the associated braking elements, which will subsequently be described. In a braking arrangement of this character, it will be necessary to permit relative movement between the housing structure and the disc. If the housing is fixedly mounted against movement on the supporting rods within the bores 12a and 12b, then the disc 13 must be mounted for slight axial movements, and vice versa.

As best shown in FIG. 2, the arcuate opening 14 intercepts a longitudinally extending cylindrical bore 15, the inner end of this bore communicating with the arcuate opening 14, and the outermost end of the bore opening into an end wall surface 16 of the housing. The opposite end wall, as indicated by the numeral 17 (FIG. 2), forms a closure which has its inner surface provided with a circular recess 18 which provides a seat for a braking pad 19 having axial alignment with the longitudinal axis of the cylindrical bore 15 and projecting into the arcuate opening 14 so as to bear against the adjacent side surface of the associated braking disc 13. The opposite side of the disc 13 is associated with a companion braking pad 20 which is supported within the cylindrical bore 15 and associated with actuating mechanism to be subsequently described by means of which it is moved towards and away from engagement with the disc 13.

Positioned within the cylindrical bore 15 is an actuator, as generally indicated by the numeral 21, this actuator having a cylindrical head portion 22 and an axially extending shaft portion 23. The head portion is provided with a circular recess 24 within which the braking pad 20 is seated.

The shaft portion 23 is rotatably supported within a central opening 25 of an annular bushing 26 having its periphery provided with external threads 27 for cooperative association with internal threads 28 formed on the inner wall surface of the cylindrical bore 15, these threads permitting axial adjustment of the bushing within the bore in response to rotational movements thereof.

Between the actuator head portion 22 and the bushing 26, there is positioned an annular thrust plate 29 having a central opening 30 for the passage of the shaft portion 23. This thrust plate is retained against rotational movement by means of diametrically positioned projecting lugs 31—31 which are slidably adapted to guiding grooves 32—32 on opposite sides of the inner wall of the cylindrical bore 15.

As best shown in FIG. 2, the thrust plate has one face which normally engages the adjacent face of the bushing 26, while its opposite face 33 is in surface engagement with the adjacent face 34 of the head portion 22 of the actuator.

Camming means are provided between the actuator head portion 22 and the thrust plate 29 by providing a plurality of circumferentially spaced sets of registering conical recesses 35 and 36 respectively in the faces 33 and 34, and which cooperatively form a receiver for a cam ball 37 in each case. As thus arranged, it will be clearly apparent that rotation of the shaft 23 will cause relative rotational movement between the head portion 22 of the actuator, and the thrust plate 29 in such a manner that the coaction of the conical walls of the recesses 35 and 36 with the camming balls 37 will act to force the head portion 22 in an axial direction away from the thrust plate 29, this movement constituting a braking movement which will move the braking elements into braking position. Movement of the braking elements to non-braking position will be accomplished by rotational movement of the actuator in an opposite direction to restore the axial alignment of the recesses 35 and 36 in each case. It will be evident at this point that the non-braking position of the elements will be established by the position of the bushing 26 within the cylindrical bore 15, and that this position may be adjusted by causing threaded movement of the bushing by rotation thereof.

The mechanism for compensating for wear of the braking elements, and for maintaining non-braking clearance of the elements will now be described. In general this is accomplished by means of pawl and ratchet mechanism. As will be clearly apparent in FIG. 3, the bushing 26 is provided on its outer end face with a plurality of radially extending ratchet teeth 38.

For rotating the bushing 26 in a direction to axially move it further into the cylindrical bore 15, an advancing pawl 39 is utilized. This pawl is formed as a deflected finger at the periphery of an annular disc 40, this disc having a central opening 41 through which the shaft portion 23 extends. As an important feature of the ratchet mechanism, a lost motion connection is established between the disc 40 and the shaft portion 23. Such a connection may be accomplished in a variety of structures. In the present instance, the connection comprises a projecting finger 42 which extends into the opening 41, this finger being positioned within a longitudinally extending surface slot 43 formed in the shaft portion 23. The slot 43 is of greater width than the width of the finger 42 by an amount which will determine the clearance of the braking members when in non-braking position. By utilizing an elongate slot 43, the annular disc 40 may move along the shaft portion 23 as adjusting movements of the bushing 26 occur. The pawl 39 is so arranged that it will engage the ratchet teeth on the bushing to cause rotation thereof only during counterclockwise movements, as viewed in FIG. 3.

The bushing 26 is restrained against rotational movement in a clockwise direction by means of a holding pawl 44 which extends through a peripheral notch 45 of the disc 40 to make engagement with the ratchet teeth of the bushing. The holding pawl likewise comprises a deflected finger at the periphery of a disc 46 having a central opening 47' therein for receiving the shaft portion 23. The disc 46 is retained against rotary movement, while permitting axial movement, by means of diametrically outwardly projecting lugs 47—47 which are adapted to extend into the guiding grooves 32—32.

Rotation of the actuator is accomplished by means of an operating arm or lever 48 which has a spline connection with the outer end of the shaft portion 23 and is retained in secured position against an abutment end flange 49 by means of a spring washer 50 and an associated retaining bolt 51. A coiled spring 52 positioned around the shaft portion 23 between the lever 48 and the disc 46 acts to axially bias the actuator outwardly in a direction to cause the head portion 22 to move towards the thrust plate 29 and normally assume a non-braking position.

As viewed in FIG. 1, the lever 48 would be rotated in a clockwise direction in order to move the braking elements into braking position. This movement of the lever 48 acts through the recesses 35, 36, and the associated cam ball in each case to force the braking elements into braking position, and upon release, the coiled spring 52 will restore the parts to a non-braking position with a clearance interval as indicated by the numeral 53 in FIG. 4. As the brake elements continue to wear, the finger 42 will eventually be engaged and the disc 40 gradually advanced until a position is reached in which the advancing pawl 39 will engage a new ratchet tooth on the bushing, whereupon as the lever 48 is moved in a non-braking direction, the bushing 26 will be rotated and axially advanced farther into the cylindrical bore 15 to take up for braking element wear. The lost motion connection assures a non-braking clearance of the braking elements, while the ratchet mechanism corrects for element wear.

Various modifications may suggest themselves to those skilled in the art without departing from the spirit of my invention, and, hence, I do not wish to be restricted to the specific form or forms shown or uses mentioned, except to the extent indicated in the appended claims.

I claim:

1. Brake actuating mechanism for actuating cooperable braking elements mounted for relative movement into and out of engagement, said mechanism comprising:
   (a) a housing having a cylindrical bore;
   (b) an annular bushing axially adjustable as to position in said bore;
   (c) an actuator having a shaft portion with a head at one end cooperable with one of said braking elements, said shaft portion being rotatably mounted in said bushing;
   (d) means between said bushing and head, including camming elements operative in response to rotational movement of said shaft in one direction for moving said head in a brake actuating direction;
   (e) spring means axially urging said head in a non-braking direction;
   (f) means for rotating said shaft; and
   (g) ratchet means operable to adjustably axially position said bushing in said bore so as to compensate for brake element wear, said ratchet means being operable in response to rotational movement of said shaft.

2. Brake actuating mechanism for actuating cooperable braking elements mounted for relative movement into and out of engagement, said mechanism comprising:
   (a) a housing having a cylindrical bore;
   (b) an annular bushing axially adjustable as to position in said bore;
   (c) an actuator having a shaft portion with a head at one end cooperable with one of said braking elements, said shaft portion being rotatably mounted in said bushing;
   (d) an axially movable thrust plate supported between said head and bushing;
   (e) camming elements between said thrust plate and head operative in response to rotational movement of said shaft in one direction for moving said head in a brake actuating direction;
   (f) spring means axially urging said head in a non-braking direction;
   (g) means for rotating said shaft; and
   (h) ratchet means operable to adjustably axially vary the position of said bushing so as to compensate for a brake element wear, said ratchet means being operable in response to rotational movement of said shaft.

3. Brake actuating mechanism for actuating cooperable braking elements mounted for relative movement into and out of engagement, said mechanism comprising:
   (a) a housing having a cylindrical bore;
   (b) an annular bushing axially adjustable as to position in said bore in response to rotational movement thereof;
   (c) an actuator having a shaft portion with a head at one end cooperable with one of said braking elements, said shaft portion being rotatably mounted in said bushing;

(d) an axially movable thrust plate supported between said head and the bushing;
(e) camming elements between said thrust plate and head operative in response to rotational movement of said shaft in one direction for moving said head in a brake actuating direction;
(f) spring means axially urging said head in a non-braking direction;
(g) means for rotating said shaft; and
(h) ratchet means operable in response to shaft rotation for adjustably axially positioning said bushing, said ratchet means having a lost motion connection with said shaft.

4. Brake actuating mechanism for actuating cooperable braking elements mounted for relative movement into and out of engagement, said mechanism comprising:
(a) a housing having a cylindrical bore;
(b) an annular bushing axially adjustable as to position in said bore in response to rotational movement thereof and having ratchet teeth at one end;
(c) an actuator having a shaft portion with a head at one end cooperable with one of said braking elements, said shaft portion being rotatably mounted in said bushing and having an elongate axially extending slot at its other end;
(d) an axially movable non-rotatable thrust plate supported between said head and the bushing;
(e) camming elements between said thrust plate and head operative in response to rotational movement of said shaft in one direction for moving said head in a brake actuating direction;
(f) spring means axially urging said head in a non-braking direction;
(g) means for rotating said shaft; and
(h) ratchet means operable in response to shaft rotation for rotating and adjustably axially positioning said bushing, said ratchet means including a rotatable disc member carrying an advancing pawl engageable with said teeth and a projection loosely extending between the sides of said slot.

5. Brake actuating mechanism for actuating cooperable braking elements mounted for relative movement into and out of engagement, said mechanism comprising:
(a) a housing having a cylindrical bore with a threaded inner wall portion;
(b) an annular bushing threaded in said bore wall portion and axially adjustable as to position therein in response to rotational movement;
(c) an actuator having a shaft portion with a head at one end cooperable with one of said braking elements, said shaft portion being rotatably mounted in said bushing;
(d) a thrust plate between said head and the bushing restrained against rotation, but axially movable of said bore;
(e) cam balls respectively supported between said head and said thrust plate in recesses therein operative to move said head and thrust plate apart upon relative rotation thereof from a fixed brake released position;
(f) spring means axially urging said head towards said thrust plate;
(g) means for rotating said shaft in a braking direction from said brake released position;
(h) means restraining rotation of said bushing in one direction; and
(i) means having a lost motion connection with said shaft operable in response to movement of said shaft towards brake released position to rotate said bushing in a direction opposite to said one direction, whereupon the bushing will be axially moved by its threads in a direction towards said thrust plate and compensate for a brake element wear.

6. Brake actuating mechanism for actuating cooperable braking elements mounted for relative movement into and out of engagement, said mechanism comprising:
(a) a housing having a cylindrical bore with a threaded inner wall portion;
(b) an annular bushing threaded in said bore wall portion and axially adjustable as to position therein, said bushing having ratchet teeth at one end thereof;
(c) an actuator having a shaft portion with a head at one end cooperable with one of said braking elements, said shaft portion being rotatably mounted in said bushing;
(d) a thrust plate between said head and bushing restrained against rotation, but axially movable of said bore;
(e) cam balls respectively supported between said head and said thrust plate in recesses therein operative to move said head and thrust plate apart upon relative rotation thereof;
(f) spring means axially urging said head towards said thrust plate;
(g) means for selectively rotating said shaft in a braking direction and a non-braking direction;
(h) a holding pawl operably engaging said ratchet teeth to restrain rotation of said bushing in one direction; and
(i) an advancing pawl having a lost motion connection with said shaft operable in response to movement of said shaft in non-braking direction to rotate said bushing in a direction opposite to said one direction, whereupon the bushing will be axially moved by its threads in a direction towards said thrust plate and compensate for brake element wear.

References Cited in the file of this patent
UNITED STATES PATENTS

| | | |
|---|---|---|
| 2,245,987 | Lambert | June 17, 1941 |
| 2,481,319 | MacDougall | Sept. 6, 1949 |
| 3,059,731 | Gancel et al. | Oct. 23, 1962 |

FOREIGN PATENTS

| | | |
|---|---|---|
| 192,446 | Austria | Oct. 25, 1957 |